United States Patent Office 3,585,131
Patented June 15, 1971

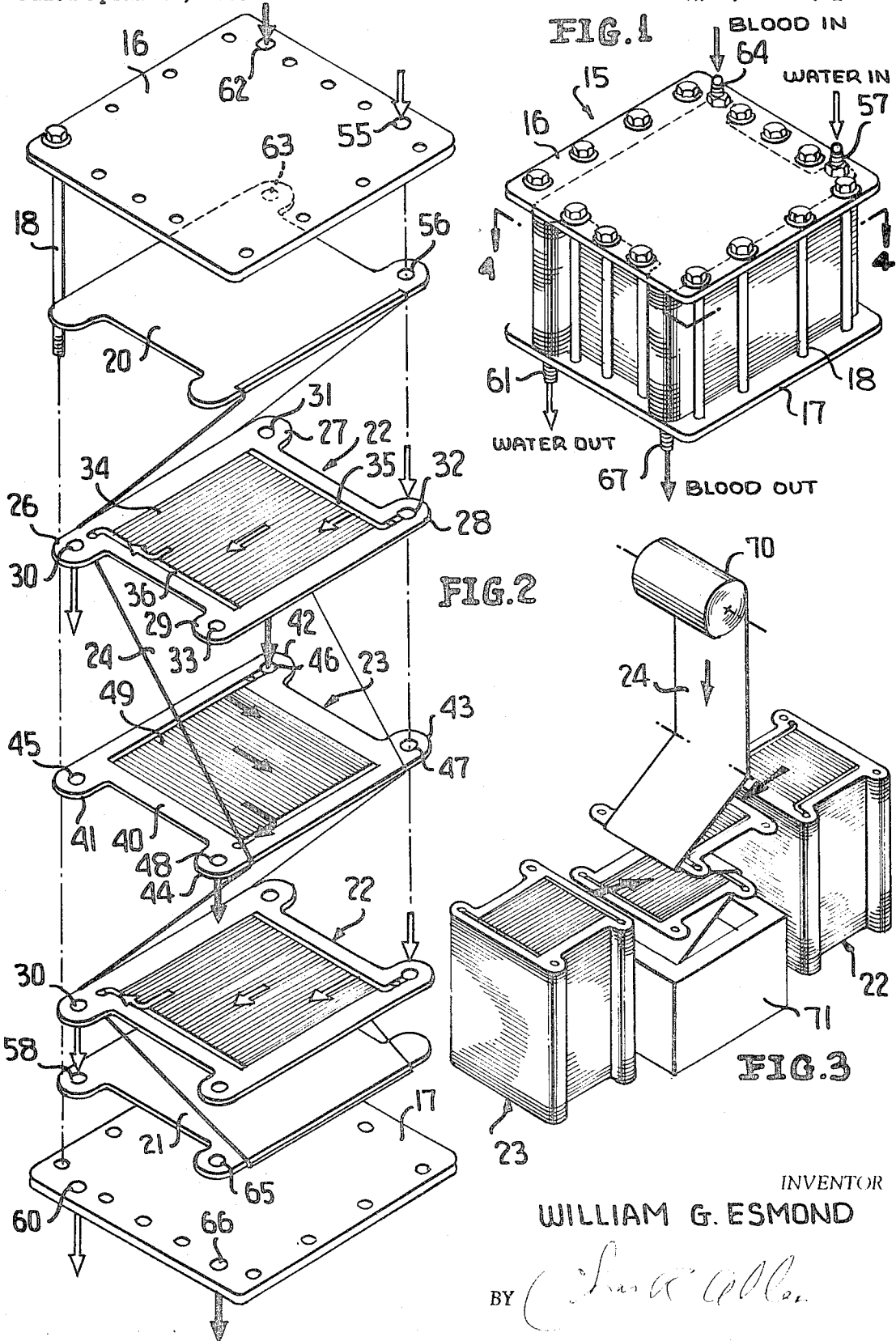

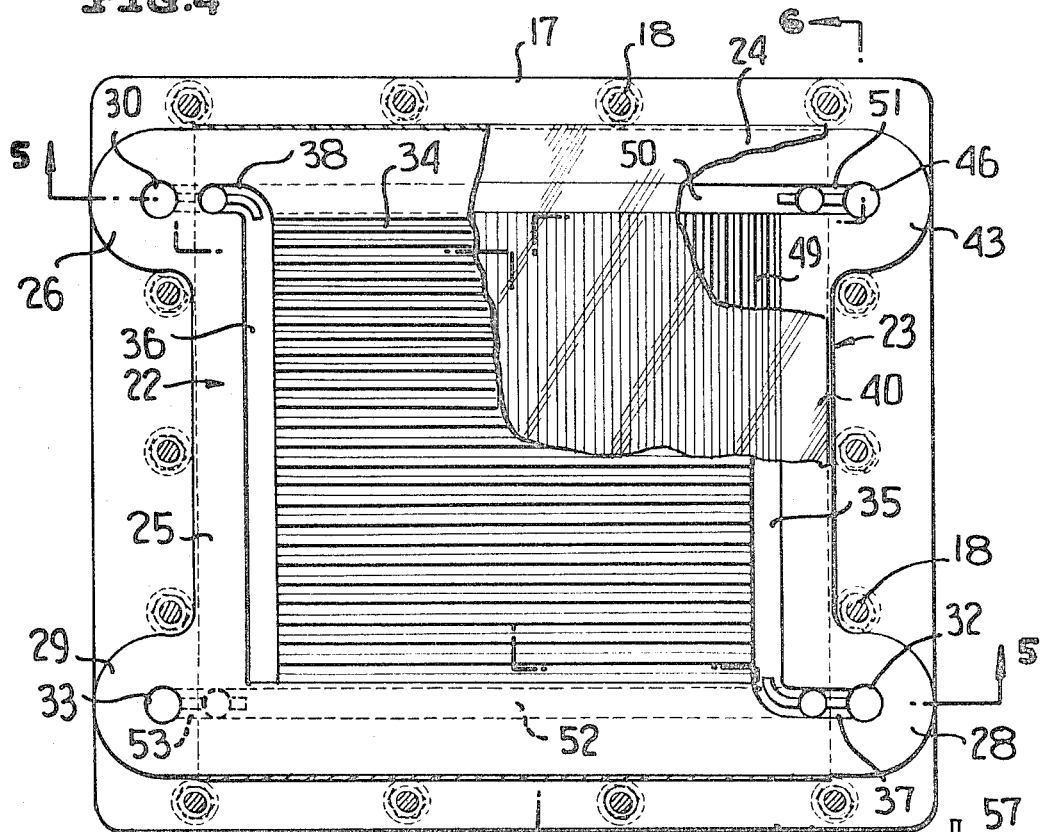
FIG.4
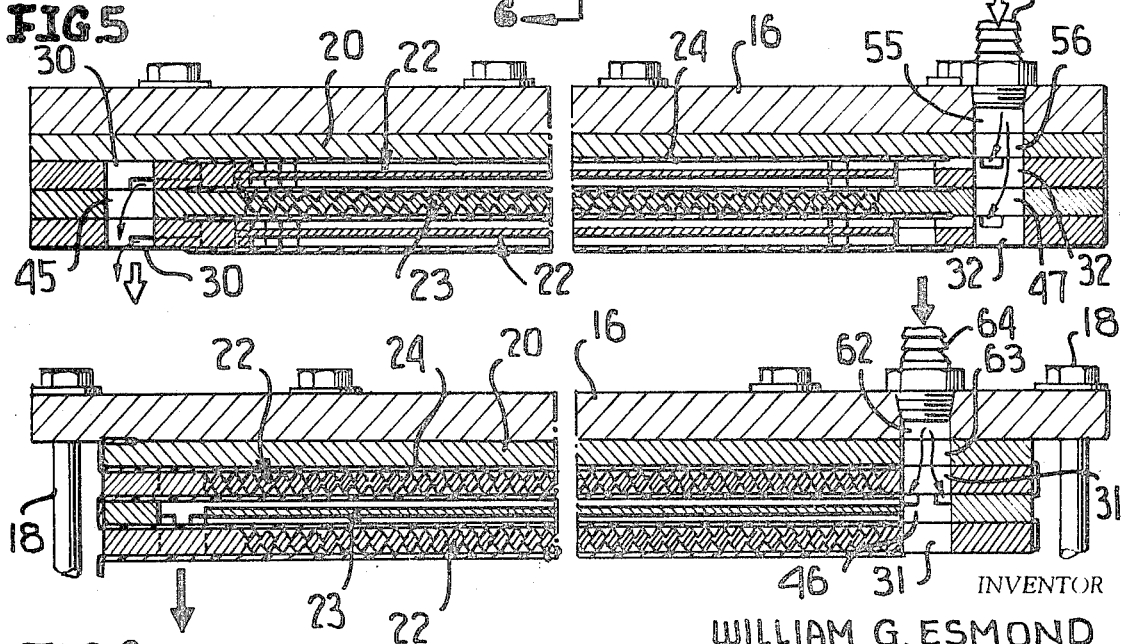
FIG.5
FIG.6
INVENTOR
WILLIAM G. ESMOND
BY
ATTORNEY

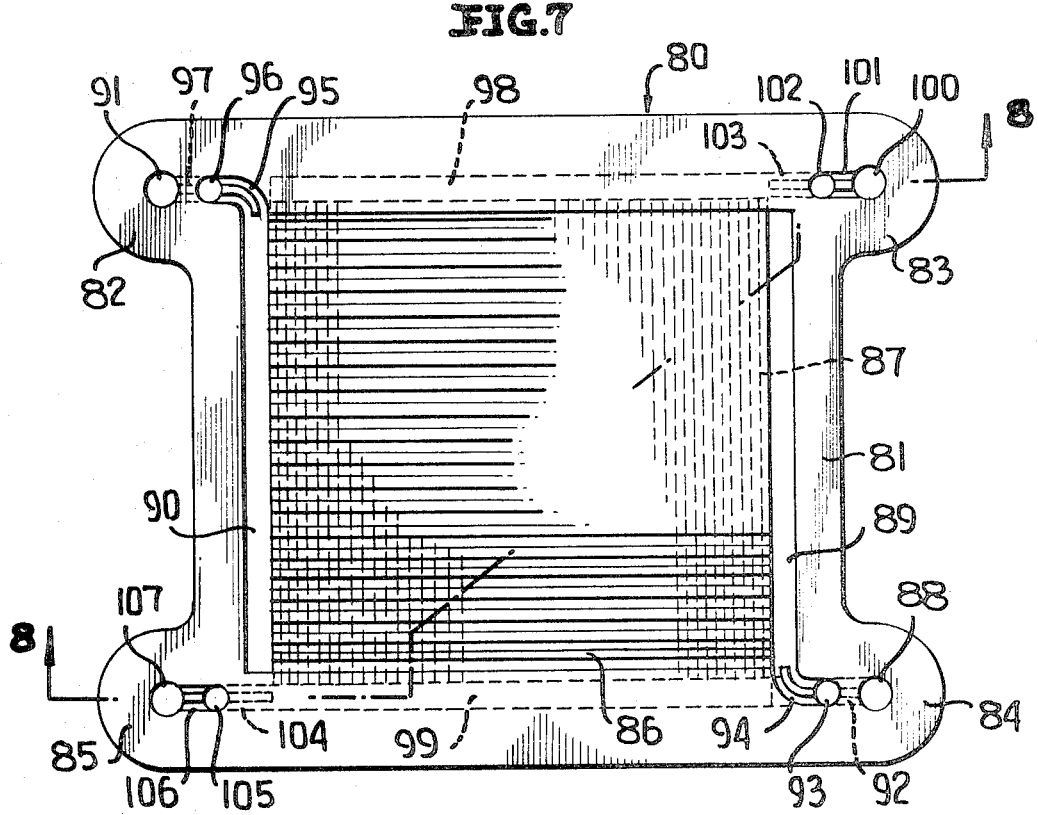
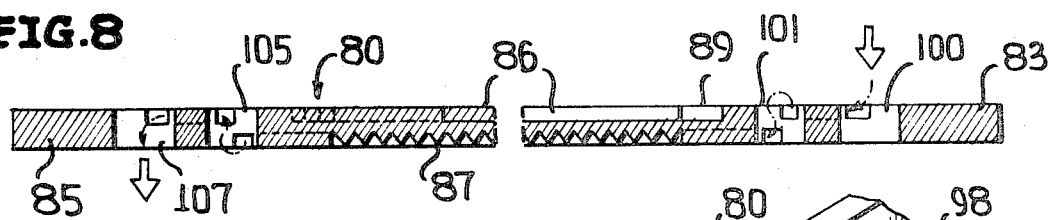
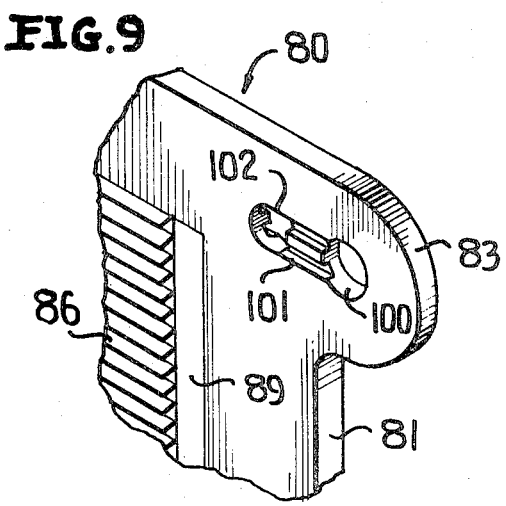
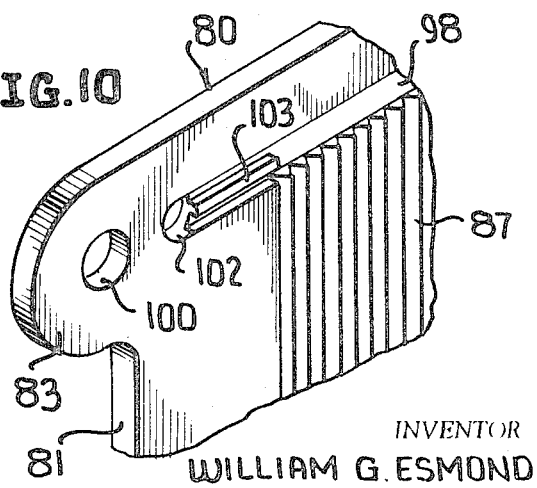

3,585,131
PLEATED MEMBRANE EXCHANGE DEVICE
William G. Esmond, Baltimore, Md., assignor to Becton, Dickinson and Company, Rutherford, N.J.
Filed Apr. 24, 1969, Ser. No. 818,970
Int. Cl. B01d 31/00
U.S. Cl. 210—321                              4 Claims

ABSTRACT OF THE DISCLOSURE

An exchange apparatus employed in desalination, ultrafiltration, in the transfer of heat, the transfer of gas from the gas phase to the liquid phase, or the transfer of gases from the gas phase to another gas phase on the opposite sides of a permeable or permselective membrane or to the transfer of waste products from blood to a suitable rinsing fluid. The exchange device is formed of a plurality of flow sheets or plates which are disposed between intermediate portions of a continuous pleated membrane. The flow plates have flow facilitating means formed therein and are reusable while the membrane is disposable.

---

This invention relates in general to new and useful improvements in exchange devices, and more particularly to an exchange device which, depending upon the membrane employed therein, may be utilized for the transfer of heat by conduction through the membrane, or when the membrane is permeable, may provide for the transfer of gas either from a gas phase to a liquid phase or from a gas phase to a gas phase. The device may be used for the cleansing of blood by the transfer of waste products by dialysis, ultrafiltration and osmosis through a suitable membrane to a suitable flowing rinsing solution in which the wastes are washed away.

A primary feature of the exchange device is the formation thereof. The exchange device is formed of a plurality of flow plates which are separated by a membrane, the membrane preferably being continuous and arranged in a pleated form. The flow plates may be reusable or disposable and readily sterilizable while the membrane is intended to be disposable.

A principal feature of the exchange device is the construction of the flow plates. The flow plates are generally rectangular in outline and are provided with ears at the corners thereof, the ears forming supply and return manifolds while the flow plates have formed in the faces thereof shallow grooves in the form of a flow grid. The flow plates are arranged so that opposing flow grids are in crossing relation and a membrane disposed therebetween is clamped at a plurality of points of crossing of the flow grids.

Another feature of this invention is the provision of an improved transfer device which can be manufactured economically and rapidly by an automatic assembly technique so as to provide single use disposable modules for medical application as membrane oxygenators, heat exchangers, artificial kidneys, or gas transfer and oxygen enrichment devices, or reverse osmosis devices for desalination of brackish sea water.

A further object of this invention is the miniaturization of the artificial kidney, blood heat exchanger and membrane oxygenator to make these devices more practical and simple to handle and have lower priming volume.

In accordance with this invention, the flow plates are vacuum formed, press formed or injection molded so as to be extremely accurate in the formation thereof and the membrane is formed of such materials as cellophane, Cuprophan, silicone rubber, silicone-polycarbonate, or other silicone derivatives when the membrane is permeable of permselective, and of such materials as Mylar, stainless steel, silver, etc. when used as a heat exchanger. Cellulose acetate membrane may be used in assembly and be used as such for reverse osmosis or be hydrolized to cellulose after assembly to provide a dialysis device.

With the above and other objects in view that will hereinafter appear, the nature of the invention will be more clearly understood by reference to the following detailed description, the appended claims and the several views illustrated in the accompanying drawings.

In the drawings:

FIG. 1 is a top perspective view of a typical exchange device formed in accordance with this invention.

FIG. 2 is an exploded perspective view showing the general construction of the exchange device, only three of the flow plates being shown.

FIG. 3 is a schematic view showing the manner in which the flow plates and a pleated membrane may be assembled.

FIG. 4 is an enlarged horizontal sectional view taken along the line 4—4 of FIG. 1 and shows the specific construction of a typical flow plate.

FIG. 5 is a transverse vertical sectional view taken along the line 5—5 of FIG. 4 and shows typical flow of one medium through the exchange device.

FIG. 6 is a fragmentary vertical sectional view taken along the line 6—6 of FIG. 4 and shows the typical flow of a second medium through the exchange device.

FIG. 7 is a plan view of a modified form of flow plate and shows the specific constructional details thereof.

FIG. 8 is a vertical sectional view taken along the line 8—8 of FIG. 7 and shows the specific configuration of the flow plate.

FIG. 9 is an enlarged fragmentary perspective view of one corner of the flow plate of FIG. 7 and shows the specific means for controlling flow thereto.

FIG. 10 is a fragmentary perspective view similar to FIG. 9 and shows the opposite face of the flow plate.

Referring now to the drawings in detail, it will be seen that there is illustrated in FIGS. 1 and 2 a typical exchange device formed in accordance with this invention, the exchange device being clearly identified by the numeral 15. The exchange device 15 includes a pair of end plates or clamping plates 16 and 17 which are clamped together by bolts 18 extending therethrough generally about the periphery thereof.

Disposed next to the end plate 16 is a sealing gasket 20. A similar sealing gasket 21 is disposed next to the end plate 17. Disposed between the sealing gaskets 20 and 21 are stacked flow plates 22 and 23 which are disposed in alternating relation and which are separated by a continuous membrane 24 which is disposed in a pleated arrangement. It is to be understood that the membrane 24 extends between the endmost ones of the flow plates and the sealing gaskets.

Referring now to FIG. 4 in particular, it will be seen that each of the flow plates 22 includes a generally rectangular body portion 25 having formed integrally therewith at the corners thereof ears 26, 27, 28 and 29. It is to be noted that these ears project from the opposite ends only of the body 25, leaving the sides of the body 25 planar.

Each of the four ears of the flow plate 22 functions as a manifold with the ears 26, 27, 28 and 29 having ports 30, 31, 32 and 33, respectively, formed therethrough. In the illustrated use of the flow plate 22, the port 32 is a supply port while the port 30 is a return port. The opposite faces of the flow plate 22 are provided with minute grids which extend transversely of the flow plate generally between the ends thereof so as to define a very shallow, but accurately formed flow grid 34. The flow grid 34 is open at the right end thereof into a distribution groove 35 and at the left end thereof into a collection groove 36. The distribution groove 35 is communicated with the supply port 32 by means of a flow control groove arrangement 37 which is in the form of a pair of separated accurately formed grooves which control the flow of a liquid or gas from the supply port 32 into the distribution groove 35.

In a like manner, the collection groove 36 is connected to the return port 30 by a flow control groove assembly 38 which terminates at an opening through the flow plate. Once again, the control groove arrangement is in the form of two separately formed grooves, which grooves are extremely accurately formed.

It is to be understood that the opposite face of the flow plate 22 has like grooves formed therein except that the groove 37 terminates at an opening through the flow plate and the groove 38 extends beyond its respective opening into the port 30.

Each of the flow plates 23 is of the same outline as the flow plate 22. Furthermore, it is provided with four corners defining manifolds in the same manner as does the flow plate 22. The generally rectangular body of the flow plate 23 is identified by the numeral 40, while the four corners thereof are identified by the numerals 41, 42, 43 and 44. The corners 41, 42, 43 and 44 are provided with ports 45, 46, 47 and 48, respectively, which, in turn, are aligned with the ports 30, 31, 32 and 33, respectively, of the flow plates 22.

The port 46 of each flow plate 23 is a supply port while the port 48 is a return port. The opposite faces of the body 40 are provided with a minute groove formation which extends generally longitudinally of the flow plate between the sides thereof with the minute groves defining a flow grid 49 on each face of the flow plate 23. At one end of the flow grid 49 there is a distribution groove 50 which is communicated with the supply port 46 by means of a flow control groove assembly 51. The flow control groove assembly 51 is in the form of two accurately formed spaced apart grooves.

The end of the flow grid 49 remote from the distribution groove 50 opens into a collection groove 52, the collection groove 52 being in communication with the return portion 48 and is coupled thereto by means of a flow control groove assembly 53 which is accurately formed and is in the form of a pair of grooves or channels.

It will be readily apparent from FIG. 4 that inasmuch as the flow grids 34 and 49 are disposed in crossing relation, if the flow plates 22 and 23 were in contacting relation, they would contact each other at an extreme large number of crossing points. In a like manner, the membrane 24 disposed between the flow plates 22 and 23 is axially gripped at a plurality of these crossing points. It is to be noted that the membrane 24, while it does extend entirely from side to side of the flow plates 22 and 23, is of a width slightly less than the width of the bodies 25 and 40 of the flow plates 22 and 23, respectively, but wider than the flow grids 34 and 49 thereof so as to form an effective seal between the opposing flow grids.

At this time it is pointed out that although the membrane 24 is not disposed between the respective ears of the flow plates, in view of the fact that the membrane is extremely thin, the membrane being in the form of a foil, the membrane is sufficiently compressed between the flow plates 22 and 23 so that the ears of these flow plates are in intimate contact with one another and are thus directly sealed to one another. It is also pointed out at this time that the bolts 18, while they do not pass through the flow plates 22 and 23, are so arranged about the peripheries of the flow plates so as to maintain them in alignment with respect to one another.

Referring once again to FIGS. 1 and 2, it will be seen that the end plate 16 is provided with a threaded port 55 which is a first fluid inlet port and which is aligned with a port 56 in the gasket member 20. The port 56, in turn, is aligned with the supply port 32. A first fluid supply fitting 57 is threaded into the port 55, as is best shown in FIG. 1.

The gasket member 21 is provided with a return port 58 which is aligned with the return ports 30 and 45. The return port 58, in turn, is aligned with a threaded return port 60 formed in the end plate 17. A first fluid return fitting 61 is threaded into the return port 60.

The end plate 16 is also provided with a supply port 62 which is internally threaded and which is aligned with a supply port 63 formed in the gasket member 20. The supply port 63 is aligned with the supply ports 31 and 46. A second fluid supply fitting 64 is threaded into the supply port 62, as is best shown in FIG. 1.

The gasket member 21 is provided with a second return port 65 which is aligned with the return ports 33 and 48. The return port 65 is also aligned with a second return port 66 in the end plate 17. The return port 66 is internally threaded and has threaded therein a second fluid return fitting 67, as is shown in FIG. 1.

It will be readily apparent from FIGS. 1, 2, 4, 5 and 6 that a first fluid supplied through the fitting 57 will be delivered to each of the flow plates 22 with the flow of the first fluid being across both faces of the flow plates 22. The collected first fluid will then be discharged out through the return fitting 61. Thus, there is both a transverse and diagonal flow of the first fluid through the exchange device 15.

A second fluid enters into the exchange device 15 through the supply fitting 64 and is delivered to the opposite faces of the flow plates 23. The collected second fluid exits out of the exchange device 15 through the return fitting 67. The second fluid flows longitudinally and diagonally with respect to the flow plates 23, as is best shown in FIG. 2.

It will be readily apparent from FIG. 3 that the flow plates 22 and 23 and the membrane 24 may be readily assembled under sterile conditions. Presterilized flow plates 22 and 23 are arranged in stacks and the membrane 24 is supplied in the form of a roll 70. By alternately engaging the membrane 24 from opposite sides with the flow plates 22 and 23, the membrane 24 is automatically pleated and the assembled flow plates and membrane are received in a stacker box. After the flow plates 22 and 23 have been assembled with the membrane 24, the predetermined stack is then assembled with the end plates 16 and 17 and the gasket members 20 and 21 to form the transfer device 15.

Reference is now made to FIGS. 7 through 10 wherein there is illustrated a modified form of flow plate which is generally referred to by the numeral 80. The flow plate 80 includes a generally rectangular body having ears 82, 83, 84 and 85 projecting from the corners thereof.

One face of the body 81 is provided with a transverse flow grid 86 whereas the opposite face thereof is provided with a longitudinal flow grid 87. The ear 84 is provided with an inlet port 88 for supplying a fluid to a distribution channel 89 for the flow grid 86. The flow grid 86 empties into a collection channel 90 which, in turn, discharges into a return port 91 formed in the ear 82.

It is to be noted that fluid supplied through the port 88 passes through a distribution channel assembly 92 formed in the face of the ear 84 remote from that face of the body 81 in which the flow grid 86 is formed. Flow is from the flow control channel assembly 92 into a flow control port 93 through the flow plate 80. Then flow is from the port 93 through a channel assembly 94 into the distribution channel or groove 89.

Return flow is from the collection channel 90 into a flow control channel assembly 95 and then through a flow control port 96 to the opposite face of the flow plate 80 and then through a flow control channel assembly 97 into the return port 91. Fluid is supplied to the flow grid 87 through a distribution channel 98 and is collected in a collection channel 99. Fluid is supplied to the distribution channel 98 through a supply port 100 formed in the ear 83. Fluid from the port 100 enters into a flow control channel 101 and then through the flow plate 80 by means of a flow control port 102 and finally into the distribution channel 98 through a flow control channel assembly 103.

Return flow from the collection channel 99 is through a flow control channel assembly 104 and then through the flow plate 80 by means of a flow control port 105. The return flow is then through a flow control channel assembly 106 into a return port 107 formed in the ear 85.

It will be readily apparent that inasmuch as different fluids flow on opposite faces of the flow plate 80, the flow plate 80 may replace the flow plates 22 and 23. Thus, in lieu of requiring two different flow plates, a single type of flow plate 80 may be utilized in forming an exchange device. The manner in which the flow plate 80 is utilized will be the same as that described with respect to the flow plates 22 and 23.

It is to be understood that the flow plates may be formed of any suitable material which is suitable for direct contact with human blood. In a like manner, it is to be understood that the membrane 24 will be varied depending upon the specific purpose of the exchange device. For example if the exchange device is to be utilized as a dialyzer, Bemberg PT 150 Cuprophan membrane may be utilized. On the other hand, if the exchange device is merely a heat exchanger, the membrane may be in the form of a 1 mil Mylar film, 5 mil silver or 5 mil stainless steel foil. On the other hand, if the exchange device is in the form of an artificial lung, the membrane may be a silicone-polycarbonate membrane 1 mil thick. For desalination of brackish water by reverse osmosis thin cellulose acetate membrane may be used and an improved membrane support for high pressures may be formed by filling the grooves and channels under the membrane with glass beads or other porous types of support material (not shown).

It will be readily apparent that inasmuch as the exchange device is modular in design, it can be made up in many different models. The exchange device is designed so that the individual parts thereof may be produced at low costs and assembled inexpensively in an automatic assembly machine and, therefore, may be produced in a clean, sterile fashion, the components thereof being sterilized with ethylene oxide gas and packaged in a sealed package ready for instant application and then disposed of after use, if desired. The device can be built to withstand the high pressure required for reverse osmosis desalination or for high flow ultrafiltration applications.

It is to be understood that when the exchange device is utilized as an artificial human organ, it is desirable that the grooves of the flow grid through which the blood flows be disposed vertically so as to eliminate blood sludging. Furthermore, the introduction of dialysate into the base of the exchange device with the discharge thereof from the top of the exchange device will eliminate air entrapment. It is further to be noted that the geometry of the flow pattern is fixed in the exchange device so that an even flow pattern is provided resulting in predictable uniform proportioning of blood and dialysate or blood and exchange gas or blood and heat transfer of fluid.

The end plates of the exchange device may be formed of various suitable materials although it has been found that they may be precision injection molded from glass filled polycarbonate resin or machined from steel, such as stainless steel. Although the flow plates may be of any desired construction, as indicated above, they are preferably precision injection molded of polypropylene plastic or silicone rubber or suitable specialized plastics to possess a smooth glossy surface. In the event the flow plates are to be in contact with blood, they will, of course, have chemical and zeta potential properties ideal for contact with blood.

Although only a preferred form of the exchange device have been specifically illustrated and described herein, it is to be understood that minor variations may be made in the exchange device without departing from the spirit of the invention.

I claim:
1. An exchange device for use with gaseous and liquid mediums, said exchange device comprising a plurality of flow plates arranged in stacked relation, each flow plate being generally rectangular in outline and having projecting ears at the corners thereof with through passages therein defining inlet and outlet manifolds for said flow plates, a continuous membrane arranged in pleated relation between said flow plates and sealing adjacent flow plates, said membrane being of a foil thickness and being excluded from said ears with said ears being in fluid and gas tight face-to-face engagement, end plates at the opposite ends of said stacked flow plates, and clamp means extending between said end plates and clamping said flow plates tightly together against said membrane, each face of each flow plate having a flow grid formed therein and the opposing flow grids of adjacent flow plates being arranged in crossing relation whereby each membrane is clamped at numerous crossing points of said flow grids.

2. The exchange device of claim 1 wherein said clamp means are in the form of a plurality of bolts extending through said clamp plates and being disposed outside of said flow plates in surrounding closely spaced relation about the periphery thereof.

3. The exchange device of claim 1 wherein said membrane is formed of cellulose acetate and there is direct limited exchange between fluids flowing on opposite sides of said membrane, said exchange device has the function of a desalination device for removing salt from brackish water with one of said flow plates being a fresh water plate, and grooves of said fresh water plate being filled with a finer filler supporting said membrane.

4. The exchange device of claim 1 wherein said membrane is formed of a hydrolising thin cellulose acetate and there is direct limited exchange between fluids flowing on opposite sides of said membrane, said exchange device has the function of an ultrafiltration device with one of said flow plates being an ultrafiltrate collection plate, and grooves of said ultrafiltrate collection plate being filled with fine balls supporting said membrane.

References Cited
UNITED STATES PATENTS

| | | | |
|---|---|---|---|
| 3,367,505 | 2/1968 | Bray | 210—321 |
| 3,370,710 | 2/1968 | Bluemle, Jr. | 210—321 |
| 3,396,849 | 8/1968 | Lande et al. | 210—321 |
| 3,441,143 | 4/1969 | Kudlaty | 210—486X |
| 3,459,310 | 8/1969 | Edwards | 210—321 |

OTHER REFERENCES

Bixler et al., "The Diaphragm Hemodiafilter: An Alternative To Dialysis For Extracorporeal Blood Purification," from Chemical Engineering Progress Symposium Series #84, vol. 64, received in Patent Office Dec. 4, 1968, 123 pp., pp. 90–103 relied on.

"Efficient Simplified Hemodialysis," from the University of Maryland School of Medicine, Jan. 30, 1968, 4 pages relied on, copy in Gp. 176.

(Other references on following page)

Esmond et al., "Design and Application of a Disposable Stainless Steel Blood Heat Exchanger with the Integrated Disposable Plastic Disc Oxygenation System," from Trans. Amer. Soc. for Artif. Int. Organs, vol. 6, 1960, pp. 360–369 relied on.

Trans. Amer. Soc. for Artif. Int. Organs, vol. 10, 1964, pages 124 and 125 relied on, received in Patent Office June 25, 1964.

Trans. Amer. Soc. for Artif. Int. Organs, vol. 14, presented April 21 and 22, 1968, at Philadelphia, Pa., pages 231 and 232 relied on.

FRANK A. SPEAR, JR., Primary Examiner

U.S. Cl. X.R.

210—433, 493